United States Patent
Seehagen et al.

(10) Patent No.: US 12,157,789 B2
(45) Date of Patent: *Dec. 3, 2024

(54) POLYESTER-FREE LAMINATING ADHESIVE COMPOSITION

(71) Applicant: Henkel AG & Co. KGaA, Duesseldorf (DE)

(72) Inventors: Ines Seehagen, Neuss (DE); Michael Hoeltgen, Duesseldorf (DE); Helga Garmann, Hilden (DE); Dennis Bankmann, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,892

(22) Filed: May 21, 2019

(65) Prior Publication Data

US 2019/0270918 A1   Sep. 5, 2019

Related U.S. Application Data

(63) Continuation of application No. PCT/EP2017/080025, filed on Nov. 22, 2017.

(30) Foreign Application Priority Data

Nov. 25, 2016 (EP) .................................... 16200721
Nov. 25, 2016 (EP) .................................... 16200722
Feb. 16, 2017 (EP) .................................... 17156423

(51) Int. Cl.
| | |
|---|---|
| *C08G 18/48* | (2006.01) |
| *B32B 7/12* | (2006.01) |
| *B32B 27/08* | (2006.01) |
| *B32B 27/32* | (2006.01) |
| *B32B 27/34* | (2006.01) |
| *B32B 27/40* | (2006.01) |
| *B32B 37/12* | (2006.01) |
| *B32B 37/16* | (2006.01) |
| *C08G 18/12* | (2006.01) |
| *C08G 18/32* | (2006.01) |
| *C08G 18/36* | (2006.01) |

(Continued)

(52) U.S. Cl.
CPC ............ *C08G 18/4829* (2013.01); *B32B 7/12* (2013.01); *B32B 27/08* (2013.01); *B32B 27/32* (2013.01); *B32B 27/34* (2013.01); *B32B 27/40* (2013.01); *B32B 37/1284* (2013.01); *B32B 37/16* (2013.01); *C08G 18/12* (2013.01); *C08G 18/3206* (2013.01); *C08G 18/36* (2013.01); *C08G 18/4804* (2013.01); *C08G 18/4812* (2013.01); *C08G 18/4833* (2013.01); *C08G 18/4858* (2013.01); *C08G 18/6644* (2013.01); *C08G 18/6696* (2013.01); *C08G 18/724* (2013.01); *C08G 18/7621* (2013.01); *C08G 18/7671* (2013.01); *C08G 18/7685* (2013.01); *C08G 18/792* (2013.01); *C09J 5/00* (2013.01); *C09J 175/04* (2013.01); *C09J 175/08* (2013.01); *C09J 175/14* (2013.01); *B32B 37/0053* (2013.01); *B32B 2255/10* (2013.01); *B32B 2255/205* (2013.01); *B32B 2305/72* (2013.01); *B32B 2375/00* (2013.01); *B32B 2439/70* (2013.01); *B32B 2439/80* (2013.01); *B32B 2553/00* (2013.01); *C08G 2170/00* (2013.01); *C09J 2475/00* (2013.01)

(58) Field of Classification Search
CPC ................ C08G 18/12; C08G 18/3206; C08G 18/7671; C09J 175/04; C09J 175/08
See application file for complete search history.

(56) References Cited

U.S. PATENT DOCUMENTS

| | | |
|---|---|---|
| 4,623,709 A | 11/1986 | Bauriedel |
| 5,045,623 A | 9/1991 | Horn et al. |
| (Continued) | | |

FOREIGN PATENT DOCUMENTS

| | | |
|---|---|---|
| EP | 0150444 A2 | 8/1985 |
| EP | 1074597 A2 | 2/2001 |
| (Continued) | | |

OTHER PUBLICATIONS

Moh's Hardness (Typical) of Abrasives. Reade International Corp. https://www.reade.com/reade-resources/reference-educational/reade-reference-chart-particle-property-briefings/32-mohs-hardness-of-abrasives. As viewed on Nov. 17, 2021. (Year: 2021).*

(Continued)

*Primary Examiner* — Stephen E Rieth
(74) *Attorney, Agent, or Firm* — Sun Hee Lehmann

(57) ABSTRACT

The invention relates to a two-component polyurethane adhesive, in particular for laminating films, wherein the PU adhesive, based on the total weight of the laminating adhesive composition, (a) contains as resin component at least one NCO-terminated polyurethane pre-polymer having a content, based on the total weight of the resin component, of at least 40 wt % of diphenylmethanedi-isocyanate (MDI), wherein the MDI is 4,4'-diphenylmethanediisocyanate or a mixture thereof with 2,4'-diphenylmethanediisocyanate, and 2 to 20 wt % of polyglycol having a molecular weight Mw of 200 to <1000 g per mol, and (b) contains as hardener component a polyol mixture comprising 2, 3, or more different polyols and is free of polyesters. The invention further relates to the use of the adhesive for bonding films, to methods for producing composite films, and to composite films bonded with the adhesive described.

10 Claims, No Drawings

(51) Int. Cl.
*C08G 18/66* (2006.01)
*C08G 18/72* (2006.01)
*C08G 18/76* (2006.01)
*C08G 18/79* (2006.01)
*C09J 5/00* (2006.01)
*C09J 175/04* (2006.01)
*C09J 175/08* (2006.01)
*C09J 175/14* (2006.01)
*B32B 37/00* (2006.01)

(56) References Cited

U.S. PATENT DOCUMENTS

| | | | |
|---|---|---|---|
| 6,515,164 B1 | 2/2003 | Bolte et al. | |
| 6,903,167 B2 | 6/2005 | Bolte et al. | |
| 9,458,363 B2 | 10/2016 | Kollbach et al. | |
| 9,914,862 B2 | 3/2018 | Kelch et al. | |
| 2004/0122253 A1* | 6/2004 | Smith | C09J 175/04 560/26 |
| 2005/0020706 A1 | 1/2005 | Kollbach et al. | |
| 2007/0129525 A1 | 6/2007 | Eichelmann et al. | |
| 2009/0260754 A1* | 10/2009 | Te Poel | C08G 18/69 156/331.7 |
| 2012/0000603 A1 | 1/2012 | Karafilidis et al. | |
| 2012/0156506 A1* | 6/2012 | Shah | C08G 18/4829 156/331.7 |
| 2012/0263836 A1 | 10/2012 | Carlson et al. | |
| 2013/0203935 A1* | 8/2013 | Thiele | B29C 43/00 524/590 |
| 2016/0053147 A1 | 2/2016 | Kelch et al. | |
| 2017/0121578 A1 | 5/2017 | Garmann et al. | |
| 2017/0334183 A1* | 11/2017 | Kimura | B32B 27/40 |

FOREIGN PATENT DOCUMENTS

| | | | |
|---|---|---|---|
| EP | 0951493 B1 | 6/2001 | |
| EP | 1456265 | 9/2004 | |
| EP | 1341832 B1 | 10/2016 | |
| JP | 2005089491 A | 4/2005 | |
| JP | 2018030905 A | 3/2018 | |
| RU | 2448987 C2 | 4/2012 | |
| WO | 9309158 A1 | 5/1993 | |
| WO | WO-9520002 A1 * | 7/1995 | ............ C08G 18/36 |
| WO | 2005097861 A1 | 10/2005 | |
| WO | 2010091806 A1 | 8/2010 | |
| WO | 2012054922 A2 | 4/2012 | |
| WO | 2014031846 A2 | 2/2014 | |
| WO | 2014184270 A1 | 11/2014 | |
| WO | 2016001265 A1 | 1/2016 | |
| WO | WO-2016152370 A1 * | 9/2016 | ............ B32B 27/08 |
| WO | 2016164526 A1 | 10/2016 | |

OTHER PUBLICATIONS

Machine Translation of WO95/250002 A1. Jul. 27, 1995. (Year: 1995).*
Zeolites. Minerals Education Coalition. https://mineralseducationcoalition.org/minerals-database/zeolites/. As viewed on Jan. 11, 2023. (Year: 2023).*
Aerosil: Specialized fumed silica to improve adhesives & siolvents. Evonik. Mar. 2017. (Year: 2017).*
International Search Report for International PCT Patent Application No. PCT/EP2017/080028 dated Feb. 23, 2018.
DIN 53240-1:2013-06, 2007.
DIN ESO ISO 11909:2007-05.
DIN ISO 2555, 1989.
DIN 53357, 1982.
International Search Report for International PCT Patent Application No. PCT/EP2017/080025 dated Mar. 2, 2018.

* cited by examiner

POLYESTER-FREE LAMINATING ADHESIVE COMPOSITION

The present invention relates to a two-component polyurethane adhesive, in particular for laminating films, wherein the PU adhesive contains, based on the total weight of the laminating adhesive composition, (a) at least one NCO-terminated polyurethane prepolymer having a content of at least 40 wt. % diphenylmethane diisocyanate (MDI) as a resin component, wherein the MDI is 4,4'-diphenylmethane diisocyanate or a mixture thereof with 2,4'-diphenylmethane diisocyanate, and 2 to 20 wt. % polyglycol having a molecular weight ($M_w$) of 200 to <1,000 g/mol, and (b) a polyol mixture comprising at least three different polyols as a curing component, and is free of polyesters. The present invention further relates to use of the adhesive for adhesively bonding films, to methods for producing composite films, and to composite films adhesively bonded using the described adhesive.

Laminating adhesives are generally known in industry. They are solvent-containing or solvent-free, crosslinking or physically setting adhesives which are used to adhesively bond thin, planar substrates, for example plastics films, metal foils, paper, or cardboard, to one another. It is essential here that the adhesive bond only slightly reduces the flexibility of the thin individual layers, but that sufficient adhesion is nevertheless achieved. Selection of the individual film layers makes it possible to influence specific properties of these multilayer films, in particular permeability to water, other liquids, chemical resistance, and permeability to oxygen or other gases.

Packaging for food in solid, pasty or liquid form, plastics cutlery, medical materials, chemical products, cosmetics, cleaning agents or objects are produced from multilayer films of this kind, for example. In addition, laminates of this kind are used for industrial products such as flexible conductors, electrical insulation materials, sails or components for photovoltaics.

The above-mentioned applications in the field of food mean that these multilayer films should not contain any substances which migrate out of the packaging into the packaged product in amounts that would be harmful to health. It is ultimately also desirable for the multilayer films to have a corresponding visual appearance.

In the prior art, in particular two-component systems are known as adhesives for such fields of application. These are mixed before application and then applied to one of the films to be adhesively bonded in amounts of typically approximately 1-5 g/m². By laminating the second film onto the side of the first film to be coated with the adhesive, composite films can be obtained after curing which are used as packaging material, in particular for food but also for the other above-mentioned applications. Adhesive systems of this kind are usually transparent.

The systems that are routine in the prior art consist of NCO-terminated prepolymers comprising a polyether-polyester-based curing component. Polyester polyols lead to good adhesion to various surfaces, such as metal layers, in particular aluminum-based layers. A component that is unavoidable in polyester-containing formulations is that of cyclic esters, which can migrate from the packaging into the packaged food. Generally, but not always, these are harmless to humans, but can be detected in the human digestive tract. Formulations which are free of polyester polyols are provided for use in simple laminate structures without metal layers and as packaging for non-aggressive food such as olive oil. However, packaging of this kind is not suitable for heating, for example during pasteurization.

There is also the need for adhesive systems for composite films which do not contain any polyesters and which are nevertheless stable with respect to heat (for example pasteurization temperatures of 90-95° C. over a duration of 30 to 45 minutes) and to aggressive food.

This problem is solved by a polyurethane-based two-component laminating adhesive system which comprises at least one NCO-terminated polyurethane prepolymer having a content of at least 40 wt. % diphenylmethane diisocyanate (MDI) as the resin component, wherein the MDI is 4,4'-diphenylmethane diisocyanate or a mixture thereof with 2,4'-diphenylmethane diisocyanate, and 2 to 20 wt. % polyglycol having a molecular weight ($M_w$) of 200 to <1,000 g/mol, wherein the polyglycol is preferably polypropylene glycol having a molecular weight of 200 to <1,000 g/mol, more preferably 250 to 800 g/mol, even more preferably 300 to 700 g/mol, in particular approximately 400 g/mol, or polyethylene glycol having a molecular weight of 200 to <1,000 g/mol, more preferably 250 to 800 g/mol, even more preferably 300 to 700 g/mol, in particular approximately 400 g/mol, and a polyol mixture comprising two, three or more different polyols as the curing component. The systems described herein are characterized by good adhesion to metal layers and low viscosities.

In a first aspect, the invention therefore relates to a polyurethane-based two-component laminating adhesive composition, in particular for laminating films, containing, based on the total weight of the laminating adhesive composition,
  (a) at least one NCO-terminated polyurethane prepolymer having a content of at least 40 wt. % diphenylmethane diisocyanate (MDI) as the resin component, wherein the MDI is 4,4'-diphenylmethane diisocyanate or a mixture thereof with 2,4'-diphenylmethane diisocyanate, and 2 to 20 wt. % polyglycol having a molecular weight ($M_w$) of 200 to <1,000 g/mol, wherein the polyglycol is preferably polypropylene glycol having a molecular weight of 200 to <1,000 g/mol, more preferably 250 to 800 g/mol, even more preferably 300 to 700 g/mol, in particular approximately 400 g/mol, or polyethylene glycol having a molecular weight of 200 to <1,000 g/mol, more preferably 250 to 800 g/mol, even more preferably 300 to 700 g/mol, in particular approximately 400 g/mol; and
  (b) a polyol mixture comprising two, three or more different polyols as the curing component,
wherein the laminating adhesive composition is free of polyesters.

In another aspect, the invention relates to a method for producing composite films in which at least two identical or different plastics films are adhesively bonded using a laminating adhesive composition as described herein, and to correspondingly produced composite films.

The invention further relates to the use of composite films produced in this manner as packaging, in particular for packaging drugs or food.

In yet another aspect, the invention relates to the use of the laminating adhesive compositions described herein for adhesively bonding films.

The molecular weights specified in the present text refer to the weight-average molecular weight (Mw), unless otherwise specified. The molecular weight Mw can be determined by gel permeation chromatography (GPC) according to DIN 55672-1:2007-08 with THF as the eluent. Except where indicated otherwise, the listed molecular weights are those which are determined by means of GPC. The weight average of the molecular weight Mn can also be determined by means of GPC, as indicated previously. Alternatively, it can be determined based on an end group analysis (hydroxyl number according to DIN 53240-1:2013-06).

In relation to an ingredient, the specification "at least one" refers to the type of ingredient and not to the absolute number of molecules. "At least one polyol" thus means, for example, at least one type of polyol, i.e., that one type of polyol or a mixture of a plurality of different polyols can be used. Together with weight data, the expression refers to all compounds of the indicated type that are contained in the composition/mixture, that is to say that the composition does not contain any other compounds of this type beyond the indicated amount of the corresponding compounds.

Unless explicitly indicated otherwise, all percentages that are cited in connection with the compositions described herein refer to wt. %, in each case based on the relevant mixture.

"About" or "approximately" as used herein in connection with a numerical value refers to the numerical value ±10%, preferably ±5%.

"Free of", as used herein for example in relation to polyesters, means that the corresponding composition does not contain the mentioned component or does not contain the mentioned component in an intentionally added manner. The amount of the component in the particular composition is therefore preferably less than 1 wt. %, more preferably less than 0.5 wt. %, even more preferably less than 0.1 wt. %, most preferably less than 0.01 wt. % or below the detection limit.

The "content", as used herein in the context of the NCO-terminated prepolymer, relates to the amount of the corresponding component in a reaction mixture from which the prepolymer can be obtained, in each case based on the total weight of the reaction mixture. The feature whereby the "resin component is at least one NCO-terminated polyurethane prepolymer having a content of at least 40 wt. % diphenylmethane diisocyanate (MDI), wherein the MDI is 4,4'-diphenylmethane diisocyanate or a mixture thereof with 2,4'-diphenylmethane diisocyanate, and has 2 to 20 wt. % polyglycol having a molecular weight ($M_w$) of 200 to <1,000 g/mol" thus means that this NCO-terminated polyurethane prepolymer can be obtained by reacting a reaction mixture which, based on the total weight of the reaction mixture, contains at least 40 wt. % diphenylmethane diisocyanate (MDI), wherein the MDI is 4,4'-diphenylmethane diisocyanate or a mixture thereof with 2,4'-diphenylmethane diisocyanate, and 2 to 20 wt. % polyglycol having a molecular weight ($M_w$) of 200 to <1,000 g/mol. The remainder of the reaction mixture can be formed by other compounds having NCO-reactive groups, i.e. in particular polyols, or other polyisocyanates. The use of additional polyglycols having molecular weights Mw of 1,000 g/mol or more, in particular 1,000 to 4,000 g/mol, particularly preferably 1,000 to 2,000 g/mol, polypropylene glycol, polyethylene glycol and copolymers thereof being preferred, polypropylene glycol being very particularly preferred.

Polyurethane adhesives are generally known. They are also used for laminating multilayer films. The adhesives suitable according to the invention are two-component polyurethane adhesives. The adhesives are preferably liquid. The adhesives may contain solvents, but they are preferably free of solvents. The crosslinking of the polyurethane adhesives that are suitable according to the invention is based on the reaction of reactive NCO groups with H-acidic functional groups, for example OH groups, amino groups or carboxyl groups. An alternative crosslinking method involves the reaction of the NCO groups with moisture from the applied adhesive, the substrate, or the surroundings with formation of urea groups. These crosslinking reactions are known and they may also proceed concurrently. In order to accelerate reactions of this kind, catalysts can be introduced into the adhesive, for example amine, titanium or tin catalysts.

It has surprisingly been found that, by means of the polyester-free two-component (2K) formulations described herein, the adhesion of selected systems does not decrease, but in some cases even increases. This means that the performance of the adhesives can be improved by the formulations described herein. The mechanical properties can also be improved. It has thus been found that completely omitting polyesters in the adhesive composition leads to low viscosities, which allow quick passage through the application machines. In addition, the misting that is typical for polyester-containing adhesive compositions and which usually appears when polyester compositions pass through the application machine is prevented. The speed at which the adhesion of the formulations as described herein builds up is also comparable to or quicker than systems known in the prior art.

The adhesive according to the invention is a two-component (2K) polyurethane adhesive. According to the invention, the adhesive contains at least one NCO-terminated polyurethane prepolymer as the resin component and at least one polyol mixture as the curing component, the adhesive composition according to the present invention not containing any polyesters.

The isocyanate (NCO)-terminated polyurethane (PU) prepolymers of the resin component are obtained by reacting a polyol or a polyol mixture with a stoichiometric excess of polyisocyanate. The polyols used when preparing the prepolymer may be all polyols that are usually used for polyurethane synthesis, in particular polyether polyols; however, no polyester polyols are used since the adhesive compositions, as described herein, are free of polyester components.

Polyether polyols may be prepared from a plurality of alcohols containing one or more primary or secondary alcohol groups. As an initiator for the preparation of polyethers that preferably do not contain any tertiary amino groups, the following compounds or mixtures of said compounds can be used by way of example: Water, ethylene glycol, propylene glycol, glycerol, butanediol, butanetriol, trimethylolethane, pentaerythritol, hexanediol, 3-hydroxyphenol, hexanetriol, trimethylolpropane, octanediol, neopentyl glycol, 1,4-hydroxymethylcyclohexane, bis(4-hydroxyphenyl)dimethylmethane and sorbitol. Ethylene glycol, propylene glycol, glycerol and trimethylolpropane are preferably used, particularly preferably ethylene glycol and propylene glycol, and, in a particularly preferred embodiment, propylene glycol is used.

Alkylene oxides such as ethylene oxide, propylene oxide, butylene oxide, epichlorohydrin, styrene oxide or tetrahydrofuran or mixtures of these alkylene oxides may be used as cyclic ethers for preparing the above-described polyethers. Propylene oxide, ethylene oxide or tetrahydrofuran or mixtures thereof are preferably used. Propylene oxide or ethylene oxide or mixtures thereof are particularly preferably used. Propylene oxide is most particularly preferably used.

The molecular weight of the polyols used for synthesizing the prepolymer is preferably in the range of from 100 to 20,000 g/mol, in particular 330 to 4,500 gmol. The average functionality can be in the range of from 2 to 4.5. The PU prepolymer preferably comprises a polyether backbone.

The stoichiometric excess of polyisocyanate in the PU prepolymer is, based on the molar ratio of NCO to OH groups, in particular 1:1 to 1.8:1, preferably 1:1 to 1.6:1 and particularly preferably 1.05:1 to 1.5:1.

The known lacquer or adhesive polyisocyanates may be used, these being polyisocyanates having two or more isocyanate groups. Suitable polyisocyanates are, for example, 1,5-naphthylene diisocyanate (NDI), 2,4- or 4,4'-diphenylmethane diisocyanate (MDI), hydrogenated MDI (H12MDI), xylylene diisocyanate (XDI), tetramethyl xylylene diisocyanate (TMXDI), di- and tetra alkylene diphenylmethane diisocyanate, 4,4'-dibenzyl diisocyanate, 1,3- or 1,4-phenylene-diisocyanate, toluylene diisocyanate (TDI), 1-methyl-2,4-diisocyanato-cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, methylene triphenyl triisocyanate (MIT), phthalic acid-bis-isocyanato-ethylester, trimethylhexamethylene diisocyanate, 1,4-diisocyanatobutane, 1,12-diisocyanatododecane and dimer fatty acid diisocyanate.

Suitable at least trifunctional isocyanates are polyisocyanates which are obtained by trimerization or oligomerization of diisocyanates or by reaction of diisocyanates with low-molecular-weight polyfunctional compounds containing hydroxyl or amino groups. Commercially available examples are trimerization products of the isocyanates HDI, MDI or IPDI or adducts of diisocyanates and low-molecular-weight triols, such as trimethylolpropane or glycerol. Further examples include isocyanurates of hexamethylene diisocyanate (HDI) and isocyanurates of isophorone diisocyanate (IPDI).

Aliphatic, cycloaliphatic, or aromatic isocyanates may in principle be used, but aromatic diisocyanates are particularly suitable. A particularly preferred aromatic diisocyanate is 4,4-methylene diphenyl diisocyanate, which can be used either alone or in a mixture with 2,4-methylene diphenyl diisocyanate. The PU adhesives according to the invention may contain the isocyanates in reacted form as PU prepolymers or they contain at least a proportion of low-molecular-weight, optionally oligomeric, isocyanates.

PU prepolymers may be prepared in a known manner from the above-mentioned polyols and polyisocyanates. A prepolymer containing NCO groups may here be prepared from the polyols and isocyanates. Examples thereof are described in EP-A951493, EP-A1341832, EP-A 150444, EP-A 1456265 and WO 2005/097861.

The at least one NCO-terminated PU prepolymer is preferably an aromatic isocyanate-terminated, more preferably MDI-terminated polyurethane prepolymer consisting of one or more polyether polyol(s) and an aromatic diisocyanate, such as MDI.

According to the present invention, the resin component of the adhesive composition has a prepolymer, which can be obtained by polymerizing a reaction mixture which, based on the total weight of the reaction mixture, has a content of at least 40 wt. % diphenylmethane diisocyanate (MDI) and 2 to 20 wt % polyglycol having a Mw of 200 to <1,000 g/mol. In this case, the MDI is 4,4'-diphenylmethane diisocyanate or a mixture thereof with 2,4'-diphenylmethane diisocyanate. 2,2'-Diphenylmethane diisocyanate is preferably not contained or only contained in comparatively low amounts, i.e. less than 2 wt. %, preferably less than 1 wt. %, based on the total weight of the reaction mixture.

According to preferred embodiments, the polyglycol in the prepolymer of the resin component having a molecular weight Mw of 200 to <1,000 g/mol is polypropylene glycol having a molecular weight of 200 to <1,000 g/mol, preferably 250 to 800 g/mol, particularly preferably 300 to 700 g/mol, most preferably approximately 400 g/mol, or is polyethylene glycol having a molecular weight of 200 to <1,000 g/mol, preferably 250 to 800 g/mol, particularly preferably 300 to 700 g/mol, most preferably approximately 400 g/mol.

Additional polyglycols having a higher molecular weight in amounts of up to 58 wt. %, preferably 10 to 50 wt. %, particularly preferably 20 to 40 wt. % (in each case based on the reaction mixture from which the prepolymer is obtained), and/or (B) additional polyisocyanates, for example HDI or derivatives thereof, and/or (C) additional prepolymers may also be contained in the reaction mixture (A).

The corresponding prepolymers usually have an NCO content of 5 to 20 wt. % (determined according to Spielberger, DIN EN ISO 11909:2007-05), and have an average NCO functionality of 2 to 3.

On account of the excess of isocyanate used, the NCO-terminated PU prepolymers usually contain certain amounts of isocyanate monomers, i.e. in particular aromatic polyisocyanate monomers, for example MDI, typically in amounts of 0.1 to 25 wt. % based on the total weight of prepolymers and monomers.

The molecular weight (Mn) of the prepolymer is in particular in the range of from 1,500 g/mol to 100,000 g/mol, more particularly preferably from 2,000 g/mol to 50,000 g/mol.

In various embodiments, the resin component consists of the prepolymer, i.e. does not contain any additional components, or does not contain additional polymeric components, isocyanates and/or polyols apart from the prepolymer. In preferred embodiments, the resin component substantially consists of the prepolymer described herein, i.e. consists of at least 50 wt. %, preferably at least 70 wt. %, even more preferably at least 80 or 90 wt. %, in each case based on the total weight of the resin component, of the prepolymer.

In addition to the resin component, a curing component is contained in the binder system according to the invention. According to the present invention, the curing component comprises two, three or more different polyols.

Suitable polyols are aliphatic and/or aromatic alcohols having 2 to 6, preferably 2 to 4, OH groups per molecule. The OH groups may be both primary and secondary.

Suitable aliphatic alcohols include, for example, ethylene glycol, propylene glycol, 1,4-butanediol, 1,5-pentanediol, 1-6-hexanediol, 1,7-heptanediol, 1,8-octanediol, and the higher homologs or isomers thereof. More highly functional alcohols are likewise suitable, for example glycerol, trimethylolpropane, pentaerythritol and oligomeric ethers of the mentioned substances.

Reaction products of low-molecular-weight polyfunctional alcohols with alkylene oxides are preferably used as the polyol component. The alkylene oxides preferably have 2 to 4 C atoms. The reaction products of ethylene glycol, propylene glycol, the isomeric butanediols, hexanediols or 4,4'-dihydroxydiphenylpropane with ethylene oxide, propylene oxide or butylene oxide, or mixtures of two or more thereof are suitable, for example. The reaction products of polyfunctional alcohols, such as glycerol, trimethylolethane, or trimethylolpropane, pentaerythritol or sugar alcohols, or mixtures of two or more thereof, with the stated alkylene oxides to form polyether polyols are furthermore also suitable. Further polyols that are conventional within the context of the invention are obtained by polymerization of tetrahydrofuran (poly-THF).

Polyethers which have been modified by vinyl polymers are likewise suitable for use as the polyol component. Such products are for example obtainable by polymerizing styrene or acrylonitrile or a mixture thereof in the presence of polyethers.

Polyacetals are likewise suitable as the polyol component. Polyacetals are taken to mean compounds as can be obtained from glycols, for example diethylene glycol or hexanediol or mixtures thereof, with formaldehyde. Polyacetals which can be used within the context of the invention may likewise be obtained by polymerization of cyclic acetals.

Another group of polyols may be OH-functional polyurethane polyols, for example OH-terminated polyurethane prepolymers.

In some embodiments, one of the at least three different polyols of the curing component is a triol, in particular based on glycerol or trimethylolpropane (TMP), to which alkylene oxide (AO), in particular propylene oxide (PO), is added and which has a molecular weight $M_w$ of less than 700 g/mol, preferably 400 to <700 g/mol, even more preferably 450 to <700 g/mol. In some embodiments, the curing component of the composition according to the invention comprises 5 to 90 wt. %, preferably 15 to 60 wt. %, in particular 25 to 40 wt. % of at least one such triol. According to some embodiments, this at least one triol may be in particular a propylene oxide(PO)-based triol, for example a glycerol- or TMP-initiated molecule to which propylene oxide is added. According to preferred embodiments, the at least one triol is a propylene oxide-based triol having a molecular weight $M_w$ of at least 400, in particular at least 450 to <700 g/mol.

In some embodiments, one of the at least three different polyols of the curing component is an aliphatic, dihydric or polyhydric, preferably dihydric to tetrahydric, alcohol, preferably having a molecular weight of <150 g/mol and/or preferably having a hydroxyl number of 700 to 2,000 mgKOH/g, more preferably 1,200-1,900 mgKOH/g. In some embodiments, the curing component of the composition according to the invention comprises 0.5 to 10 wt. %, preferably 2 to 8 wt. %, in particular 3 to 7 wt. %, of at least one such aliphatic alcohol. According to some embodiments, this at least one aliphatic alcohol is an aliphatic alcohol selected from the group consisting of ethylene glycol, propylene glycol, 1,4-butanediol, 1,5-pentanediol, 1,6-hexanediol, 1,7-heptanediol, 1,8-octanediol, glycerol, trimethylolpropane and pentaerythritol. In some embodiments, the at least one aliphatic alcohol is in particular trimethylolpropane.

In some embodiments, one of the at least three different polyols of the curing component is that of higher-molecular AO-based triols, which are as defined above but have a molecular weight $M_w$ of more than 700 g/mol, preferably >700 to 1,200 g/mol, or is castor oil. Triols of this kind are commercially available as Voranol® CP 755 or CP 1055 (Dow Chemical). In some embodiments, the curing component of the composition according to the invention comprises 5 to 80 wt. %, preferably 15 to 70 wt. %, in particular 20 to 65 or 70 wt. % of such trioles or castor oil. Although castor oil contains ester groups, it is not a polyester within the meaning of the present invention since it is not based on repeating units linked by ester groups.

In various embodiments of the invention, the curing component contains at least two, preferably all three of the mentioned polyols, i.e. (1) at least one triol, in particular based on glycerol or trimethylolpropane (TMP), to which alkylene oxide (AO), in particular propylene oxide (PO), is added and which has a molecular weight $M_w$ of less than 700 g/mol, preferably 400 to <700 g/mol, even more preferably 450 to <700 g/mol; (2) at least one aliphatic dihydric or polyhydric, preferably dihydric to tetrahydric, preferably monomeric, alcohol; and (3) at least one triol, in particular based on glycerol or trimethylolpropane (TMP), to which alkylene oxide (AO), in particular propylene oxide (PO) is added, and which has a molecular weight $M_w$ of more than 700 g/mol, preferably >700 to 1,200 g/mol, or castor oil. If the curing component contains only two polyols, these are preferably the polyols listed above as (1) and (3), preferably in the specified amounts, i.e. polyol (1) in an amount of 5 to 90 wt. %, preferably 15 to 60 wt. %, in particular 25 to 40 wt. %, and polyol (3) in an amount of 5 to 80 wt. %, preferably 15 to 70 wt. %, in particular 20 to 70 wt. %, in each case based on the total weight of the curing component. For example, polyol (1) can be used in an amount of approximately 30 wt. % and polyol (3) can be used in an amount of approximately 70 wt. %.

In some embodiments, the molar NCO:OH ratio of resin component to curing component is less than 1.4, preferably less than 1.3, in particular less than 1.25, even more preferably 1.0 to 1.2. This means in particular that resin and curing components are used in amounts that lead to the desired ratios. In various embodiments, the resin component and curing component can be formulated such that they can be used in weight ratios of 2:1 to 1:2, preferably 1.5:1 to 1:1.5, particularly preferably approximately 1:1, the above-mentioned molar NCO:OH ratios preferably being achieved; "molar NCO:OH ratio" thus means the molar ratio of all NCO groups to OH groups.

In various embodiments, the binder system described herein may further contain at least one catalyst, in particular selected from Sn-based or Ti-based metal catalysts or amine catalysts. Suitable catalysts are known in the prior art. The catalyst is preferably contained in the curing component, i.e. in the systems preferred according to the invention in the hydroxyl-functionalized component.

The adhesive according to the invention may also contain the usual additives. The additional components are, for example, resins (tackifiers), stabilizers, crosslinking agents or viscosity regulators, pigments, plasticizers, or antioxidants.

The adhesives according to the invention may also further contain fillers. In various embodiments of the invention, the adhesive composition does not contain any solid particulate fillers, however, in which at least 90% of the filler particle has a particle size of 4 μm or less and which has a Mohs hardness or 3 or less, in particular not in an amount of 5 to 50 wt. % based on the adhesive composition. In various embodiments, the filler is not calcium carbonate, in particular not calcium carbonate which meets the above specifications with respect to particle size and Mohs hardness. In other embodiments, the composition may preferably be substantially free of or free of fillers.

The polyurethane adhesives according to the invention are liquid at application temperatures. It is preferable for the PU adhesives according to the invention to be liquid at room temperature. In various embodiments, the compositions described herein have, at a temperature of 40° C., a viscosity of 500 to 5,000, in particular 600 to 900 mPas, determined according to DIN ISO 2555 (Brookfield viscometer RVT, spindle no. 4, 25° C., 5 rmp).

The adhesives described herein may contain solvents or may be solvent-free. Basically, all solvents known to a person skilled in the art can be used as the solvent, in particular esters, ketones, halogenated hydrocarbons, alkanes, alkenes and aromatic hydrocarbons. Examples of such solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran, or tetrachloroethylene, or mixtures of two or more of the mentioned solvents.

In preferred embodiments, the adhesive compositions described herein are, however, substantially free of organic solvents. "Free of", as used above, means that the corresponding composition does not contain the mentioned component or does not contain the mentioned component in an intentionally added manner. The amount of the component in the particular composition is therefore preferably less than 1 wt. %, more preferably less than 0.5 wt. %, even more preferably less than 0.1 wt. %, most preferably less than 0.01 wt. % or below the detection limit.

The adhesives are applied to the substrates to be adhesively bonded, in particular films, using conventional equipment and all of the commonly used application methods, for example by means of spraying, doctoring, a ¾-roller coating machine if using a solvent-free system, or a 2-roller coating machine if using a solvent-containing system. After application, the substrates to be adhesively bonded are adhesively bonded to one another in a known manner. It is here convenient optionally to use elevated temperatures in order to achieve better application and a more rapid crosslinking reaction. However, the adhesives according to the invention already demonstrate very favorable curing at room temperature or only slightly elevated temperatures, such as 40° C.

The polyurethane adhesives according to the invention are in particular suitable as laminating adhesives for films. They may be used in a process in which known films based on polymers, such as PP, PE, OPA, polyamide, PET, polyester, or metal foils, are adhesively bonded to one another. The adhesive according to the invention is here applied onto an optionally pretreated or printed film. The application amount is here usually 1-5 g/m². This may take place at elevated temperature in order to obtain a thin and uniform coating. A second film of an identical or a different material is then laminated thereon under pressure. Heat may be applied, the adhesive crosslinks and a multilayer film is obtained. The latter may optionally also consist of more than two layers.

The films are conventionally placed in storage after production. During this time, it is possible that the adhesives according to the invention crosslink further.

By using the liquid or hot-melt adhesives according to the invention as the laminating adhesive, it is possible to obtain laminated two-layer or multilayer films which meet the stringent requirements for suitability for food packaging or medical packaging.

It shall be readily understood that all embodiments disclosed herein in connection with the PU adhesive can also be used for the uses and methods described, and vice versa.

The invention shall be described in further detail below with reference to several examples. Amounts specified therein refer to wt. %, unless otherwise specified.

EXAMPLES

Example 1 (According to the Invention)

Resin Base:
NCO-terminated MDI-prepolymer having an NCO content of 13-15 wt. % and an NCO:OH ratio of 4.3:1, obtainable from 50 wt. % 4,4'-diphenylmethane diisocyanate (MDI); 15 wt. % polypropylene glycol (PPG) having Mw=400 g/mol; 25 wt. % polypropylene glycol (PPG) having Mw=1,000 g/mol; 10 wt. % hexane-1,6-diisocyanate (HDI) trimer.

Curing Agent:
Polyol mixture having an OH value of 210-250 mgKOH/g and a functionality f=3, consisting of 30 wt. % trifunctional polypropylene glycol (PPG) having Mw=450 g/mol; 70 wt. % castor oil.

Mixing ratio resin: curing agent 100:70 parts by weight.

Example 2 (According to the Invention)

Resin Base:
NCO-terminated MDI-prepolymer having an NCO content of 13-15 wt. % and an NCO:OH ratio of 4.0:1, obtainable from 50 wt. % 4,4'-diphenylmethane diisocyanate (MDI); 10 wt. % polypropylene glycol (PPG) having Mw=400 g/mol; 30 wt. % polypropylene glycol (PPG) having Mw=1,000 g/mol; 10 wt. % toluylene diisocyanate (TDI) prepolymer*.

*TDI-prepolymer: Reaction product of 2,4'-TDI having a polyether diol having Mw=400 . . . 1,000, demonomerized.

Curing Agent:
Polyol mixture having an OH value of 330-370 mgKOH/g and a functionality f=3, consisting of 5 wt. % trimethylolpropane; 70 wt. % trifunctional polypropylene glycol (PPG) having Mw=450 g/mol; 25 wt. % castor oil.

Mixing ratio resin: curing agent 100:35 parts by weight.

Example 3 (According to the Invention)

Resin Base:
NCO-terminated MDI-prepolymer having an NCO content of 12-14 wt. % and an NCO:OH ratio of 3.9:1, obtainable from 50 wt. % 4,4'-diphenylmethane diisocyanate (MDI); 5 wt. % polypropylene glycol (PPG) having Mw=400 g/mol; 25 wt % polypropylene glycol (PPG) having Mw=1,000 g/mol; 10 wt. % polypropylene glycol (PPG) having Mw=2,000 g/mol; 10 wt. % hexane-1,6-diisocyanate (HDI) trimer.

Curing Agent:
Polyol mixture having an OH value of 330-370 mgKOH/g and a functionality f=3, consisting of 5 wt. % trimethylolpropane; 70 wt. % trifunctional polypropylene glycol (PPG) having Mw=450 g/mol; 25 wt. % castor oil.

Mixing ratio resin: curing agent 100:40 parts by weight.

Example 4 (According to the Invention)

Resin Base:
NCO-terminated MDI-prepolymer having an NCO content of 11-13 wt. % and an NCO:OH ratio of 4.3:1, obtainable from 55 wt. % 4,4'-diphenylmethane diisocyanate (MDI); 5 wt. % polypropylene glycol (PPG) having Mw=400 g/mol; 30 wt. % polypropylene glycol (PPG) having Mw=1,000 g/mol; 10 wt. % polypropylene glycol (PPG) having Mw=2,000 g/mol.

Curing Agent:

Polyol mixture having an OH value of 330-370 mgKOH/g and a functionality f=3, consisting of 5 wt. % trimethylolpropane; 70 wt. % trifunctional polypropylene glycol (PPG) having Mw=450 g/mol; 25 wt. % castor oil.

Mixing ratio resin: curing agent 100:38 parts by weight.

Example 5 (Comparative Example)

Resin Base:

NCO-terminated MDI-prepolymer having an NCO content of 11-13 wt. % and an NCO:OH ratio of 4.3:1, obtainable from 50 wt. % 4,4'-diphenylmethane diisocyanate (MDI); 10 wt. % hexane-1,6-diisocyanate (HDI) trimer; 20 wt. % polypropylene glycol (PPG) having Mw=1,000 g/mol; 20 wt. % polypropylene glycol (PPG) having Mw=2,000 g/mol.

Curing Agent:

Polyol mixture having an OH value of 210-250 mgKOH/g and a functionality f=3, consisting of 30 wt. % trifunctional polypropylene glycol (PPG) having Mw=450 g/mol; 70 wt % castor oil.

Mixing ratio resin: curing agent 100:60 parts by weight.

Example 6 (Comparative Example)

Resin Base:

NCO-terminated MDI-prepolymer having an NCO content of 12-14 wt % and an NCO:OH ratio of 3.4:1, obtainable from 55 wt. % 4,4'-diphenylmethane diisocyanate (MDI); 15 wt. % polypropylene glycol (PPG) having Mw=1,000 g/mol; 15 wt % polypropylene glycol (PPG) having Mw=400 g/mol; 15 wt. % bifunctional polyester*.

*Polyester based on isophthalic acid, adipic acid, 1,2-propanediol, diethylene glycol.

Curing Agent:

Polyol mixture having an OH value of 200-230 mgKOH/g and a functionality f~2 or 3, consisting of 75 wt. % bifunctional polyester*; 22 wt % polypropylene glycol (PPG) triol having Mw=450 g/mol; 3 wt. % trimethylolpropane.

Mixing ratio resin: curing agent 100:60 parts by weight.

Example 7 (Comparative Example)

Resin Base:

NCO-terminated MDI-prepolymer having an NCO content of 13-15 wt. % and an NCO:OH ratio of 3.7:1, obtainable from 51 wt. % 4,4'-diphenylmethane diisocyanate (MDI); 10 wt. % hexane-1,6-diisocyanate (HDI) trimer; 13 wt. % polypropylene glycol (PPG) having Mw=1,000 g/mol; 13 wt. % polypropylene glycol (PPG) having Mw=400 g/mol; 13 wt. % bifunctional polyester*.

*Polyester based on isophthalic acid, adipic acid, 1,2-propanediol, diethylene glycol.

Curing Agent:

Polyester mixture having an OH value of 200-230 mgKOH/g and a functionality f~2 or 3, consisting of 75 wt. % bifunctional polyester*; 22 wt. % polypropylene glycol (PPG) triol having Mw=450 g/mol; 3 wt. % trimethylolpropane.

Mixing ratio resin: curing agent 100:65 parts by weight.

Composite Film:

Composite films are produced using a laminating device of the Super Combi 2000 type, for example. In the process, the adhesive composition is applied in an amount of approximately 2 g/m$^2$ to one of the films to be adhesively bonded (OPA or metOPP) and this film is then laminated to the second film (PE or OPP) under pressure. In this case, the acting roller pressure of the laminating machine corresponds to a force of up to 200 N (20 kg).

Adhesion:

The adhesion is determined in accordance with the standard DIN 53357 after 14 days of curing at room temperature by means of a tensile testing machine from the company Instron (Instron 4301). For this purpose, test strips of the composite film (sample width of 15 mm) are clamped between clamping jaws, which are then pulled apart at a pulling speed of 100 m/min, a pulling angel of 90° and for a pulling length of 5 to 10 cm. The average of a three-fold determination of the maximum force to be applied based on the sample width of 15 mm is given.

Composite Materials:
OPA: oriented polyamide
PE: polyethylene
PET: polyethylene terephthalate
OPP: oriented polypropylene
metOPP: metallized OPP (OPP coated with aluminum)
Al: aluminum foil
CPP: cast polypropylene

TABLE 1

| | Parameter | Widest range | Narrowest range |
|---|---|---|---|
| | | Experimental parameters | |
| 1 | Adhesion spectrum: bond strength on PET/Al/PE PET . . . Al Al . . . PE PET/Al/CPP | >3N/15 mm after 14 days >3N/15 mm >2N/15 mm >4N/15 mm after 14 days | 3-9N/15 mm after 14 days 3-4N/15 mm 2-6N/15 mm 4-6N/15 mm after 14 days |
| 2 | Running time: a. Pot life curve (viscosity increase over time) b. Experimental test: on laminating equipment | a. Initial mixing viscosity <1,000 mPas at 40° C. b. Super combi machine >300 m/min without misting | a. 600-900 mPas at 40° C. b. V = 300-350 m/min |
| 3 | Bond strength after heat treatment: OPA$_{pr\ 14\mu}$/PE$_{50\mu}$ | >3N/15 mm without any delamination after pasteurization 30 min 90° C. | 3-5N/15 mm without any delamination after pasteurization 30 min 90° C. |

TABLE 1-continued

Experimental parameters

| | Parameter | Widest range | Narrowest range |
|---|---|---|---|
| 4 | Filler resistance: Bond strength on PET/Al/PE | Foam bath: >1N/15 mm after 14 days/40° C. in chambers, Olive oil: >2N/15 mm after 14 days/40° C. in chambers | Foam bath: 1-3N/15 mm Olive oil: 2-5N/15 mm |

The invention claimed is:

1. A polyurethane two-component laminating adhesive composition comprising:
   (a) a resin component including at least one NCO-terminated polyurethane prepolymer prepared by reacting a reaction mixture consisting of:
      at least 40 wt. % by weight, based on the total weight of the reaction mixture, of diphenylmethane diisocyanate (MDI), wherein the MDI is 4,4'-diphenylmethane diisocyanate or a mixture of 4,4'-diphenylmethane diisocyanate and 2,4'-diphenylmethane diisocyanate;
      2 to 20 wt. % by weight, based on the total weight of the reaction mixture, of polypropylene glycol having a molecular weight of from 200 to <1,000 g/mol or polyethylene glycol having a molecular weight of from 200 to <1,000 g/mol; and
      one or more components selected from the group consisting of additional polyisocyanates and polyglycols selected from the group consisting of polypropylene glycol having a molecular weight of from 1,000 to 4,000 g/mol, polyethylene glycol having a molecular weight of from 1,000 to 4,000 g/mol, copolymers of polypropylene glycol having a molecular weight of from 1,000 to 4,000 g/mol, and copolymers of polyethylene glycol having a molecular weight of from 1,000 to 4,000 g/mol; and
   (b) a curing component consisting of a mixture of a trifunctional polypropylene glycol having a molecular weight Mw of <700 g/mol and castor oil,
   wherein the polyurethane two-component laminating adhesive composition is free of polyester components and does not contain any solid particulate filler particles in which at least 90% of the filler particles have a particle size of 4 μm or less and which have a Mohs hardness of 3 or less.

2. The polyurethane two-component laminating adhesive composition of claim 1, wherein the molar NCO: OH ratio of resin component to curing component is less than 1.4.

3. The polyurethane two-component laminating adhesive composition of claim 1, wherein:
   (a) the polyurethane two-component laminating adhesive composition further comprises at least one catalyst selected from the group consisting of a Sn-based metal catalyst, a Ti-based metal catalyst, and an amine catalyst;
   (b) the polyurethane two-component laminating adhesive composition has a viscosity of from 500 to 5,000 mPas at a temperature of 40° C.;
   (c) the polyurethane two-component laminating adhesive composition is substantially free of organic solvents; or
   (d) any combination of (a), (b), and (c).

4. The polyurethane two-component laminating adhesive composition of claim 1, wherein all of the polyglycols reacted with the diphenylmethane diisocyanate (MDI) have a molecular weight Mw of 2,000 or less.

5. The polyurethane two-component laminating adhesive composition of claim 1, wherein the polyurethane two-component laminating adhesive composition is substantially free of filler particles.

6. A cured reaction product of the polyurethane two-component laminating adhesive composition of claim 1.

7. A method for producing a composite film, the method comprising:
   providing a first film and a second film, wherein the first and second films are identical or different plastic films;
   mixing the resin component and the curing component of the polyurethane two-component laminating adhesive composition of claim 1 at a predetermined NCO:OH ratio to form a laminating adhesive;
   applying the laminating adhesive over some portion of a surface of the first film; and
   disposing the second film over the laminating adhesive on the surface of the first film.

8. The method of claim 7, wherein the laminating adhesive is applied in an amount of from 1 to 5 g/m² to the portion of the first film.

9. A composite film produced by the method of claim 7.

10. A package comprising a composite film produced by the method of claim 7, the package sealingly disposed around a food product or medicament.

* * * * *